3,128,280
1-(ALKOXYLATED/HALOGENATED PHENYL)-3-
PYRIDYLMETHYLUREAS
Kurt J. Rorig, Glenview, Ill., assignor to G. D. Searle & Co., Chicago, Ill., a corporation of Delaware
No Drawing. Filed Oct. 23, 1959, Ser. No. 848,190
19 Claims. (Cl. 260—295)

This invention relates to 1-(alkoxylated/halogenated phenyl)-3-pyridylmethylureas and processes for the manufacture thereof. More particularly, this invention relates to compounds of the formula

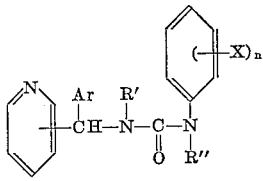

wherein Ar represents hydrogen or an aromatic radical optimally but not exclusively phenyl, R' and R" each represent hydrogen or an alkyl radical, X represents halogen or an alkoxy radical, and $n$ is a small positive integer.

Among the alkyl radicals represented by R' and R" in the foregoing formula, especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous radicals embracive of fewer than 9 carbon atoms. As to the alkoxy radicals represented by X in the formula, these likewise are desirably of lower order, i.e., comprise fewer than 9 carbons. Those skilled in the art will recognize that the degree of substitution depicted by

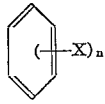

hereinabove is limited only by the number of carbon atoms (5) to which substituents can attach and the steric considerations involved in disposing a plurality of molecular aggregates within a finite space, it being provided that at least 1 halogen or alkoxy radical is always present.

Equivalent to the basic amines of this invention for the purposes here described are the corresponding acid addition and quaternary ammonium salts, of the formula

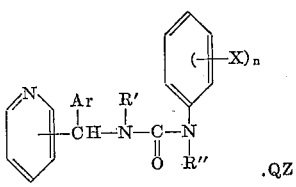

wherein Ar, R', R", X, and $n$ and have the meanings previously assigned; Q is selected from among hydrogen and lower alkyl, hydroxy(lower alkyl), and lower alkenyl radicals, as also such aralkyl radicals as benzyl, phenethyl, and naphthylmethyl; and Z is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid is neither pharmacologically nor otherwise undesirable in physiological dosage.

The compounds of this invention are useful because of their valuable pharmacological properties. Thus, for example, they inhibit the heat, swelling, redness, and granuloma formation characteristic of the inflammatory response to tissue injury. Moreover, they manifest highly desirable anti-bacterial and anti-fungal activities—representatively, against *B. subtilis* and *Trichophyton mentagrophytes*, respectively. Finally, the subject compositions affect the central nervous system, being, among other things, mildly anorectic.

Manufacture of the subject compositions readily proceeds by heating together an appropirate aminopyridine

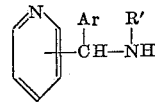

and isocyanate

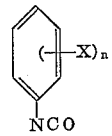

in the presence of an inert solvent such as ether or benzene, Ar, R', X, and $n$ being defined as before. As an exception to this procedure, an appropriate carbamoyl chloride

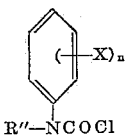

is substituted for the isocyanate when R" in the generic formula for compounds of this invention, paargraph one hereof, represents an alkyl radical.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *1 - p - chlorophenyl - 3 - (4 - pyridylmethyl)urea.*—A solution of 11 parts of 4-aminomethylpyridine and 16 parts of p-chlorophenyl isocyanate in 500 parts of anhydrous ether is heated at the boiling point under reflux for 3 hours, excess isocyanate being destroyed by introduction of 4 parts of ethanol 5 minutes prior to termination of the heating period. A solid precipitate is thrown down. The precipitate, collected on a filter and recrystallized from a mixture of ethyl acetate and cyclohexane, melts at 168–172°. This material is 1-p-chlorophenyl-3-(4-pyridylmethyl)urea.

B. *1 - p - chlorophenyl - 3 - (4 - pyridylmethyl)urea hydrochloride.*—A solution of 24 parts of the free base obtainable by the procedure of the foregoing part A of this example in 200 parts of warm absolute ethanol is made barely acid with a solution of hydrogen chloride in absolute 2-propanol. The resultant solution is diluted with anhydrous ether to the point of incipient turbidity. Upon standing, 1-p-chlorophenyl-3-(4-pyridylmethyl)urea hydrochloride precipitates as a white crystalline solid which, recrystallized from a mixture of absolute ether and anhydrous ethanol, melts at 235–236° (with decomposition). The product has the formula

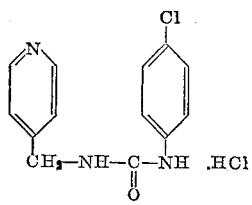

Example 2

*1 - p - chlorophenyl - 3 - (3 - pyridylmethyl)urea.*—Using the technique of Example 1A, but substituting 11 parts of 3-aminomethylpyridine for the 11 parts of 4-aminomethylpyridine called for therein, one obtains 1-p-chlorophenyl-3-(3-pyridylmethyl)urea as a white crystalline solid melting at 171–173°. The product has the formula

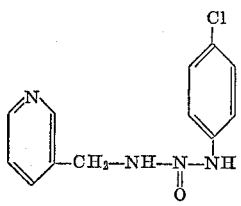

Example 3

A. *1 - o - chlorophenyl - 3 - (2 - pyridylmethyl)urea.*—Using the technique of Example 1A, but substituting 16 parts of o-chlorophenyl isocyanate and 11 parts of 2-aminomethylpyridine for the 16 parts of p-chlorophenyl isocyanate and 11 parts of 4-aminomethylpyridine called for therein, respectively, one obtains 1-o-chlorophenyl-3-(2-pyridylmethyl)urea as a white crystalline solid melting at 148–150°.

B. *1 - o - chlorophenyl - 3 - (2 - pyridylmethyl)urea hydrochloride.*—The hydrochloride of the base of the foregoing part A of this example is prepared by the technique detailed in Example 1B hereinbefore. It melts at 173–175° (with gas evolution) and has the formula

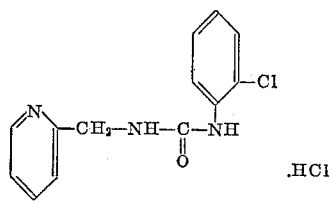

Example 4

A. *4 - (α - aminobenzyl)pyridine monohydrate.*—To a solution of 143 parts of concentrated ammonium hydroxide in 150 parts of 90% formic acid at 10° is added, with agitation, approximately 92 parts of 4-benzoylpyridine. The resultant mixture is distilled to an internal temperature of 163°, following which it is maintained in the range 163–175° under reflux for 20 hours, agitation being continued the while. The mixture is then cooled to room temperature, diluted with 360 parts of concentrated hydrochloric acid, and finally heated at the boiling point under reflux for 7½ hours. Solution occurs in process. The solution is poured into a mixture of ice and water, whereupon an excess of aqueous caustic is added. The resultant mixture is extracted with ether; and the ether extract, in turn, is extracted with 5% hydrochloric acid. From the acid extract, on introduction of an excess of aqueous caustic, is precipitated 4-(α-aminobenzyl)pyridine. The precipitate is extracted into ether, and the ether extract is dried over anhydrous sodium sulfate and distilled in vacuo. The fraction coming over in the range 143–147° at 0.1 mm. pressure is separated and further processed as follows: 400 parts of the material is dissolved in 2000 parts of hot benzene, and the resultant solution is vigorously mixed with 100 parts of water. On cooling, nicely crystalline 4-(α-aminobenzyl)pyridine monohydrate precipitates and is recovered by filtration.

B. *1 - o - chlorophenyl - 3 - (α - phenyl - 4 - pyridylmethyl)urea.*—A solution of 20 parts of 4-(α-aminobenzyl)pyridine monohydrate in 400 parts of benzene is heated at the boiling point under reflux, a trap being provided to remove the water azeotropically distilled. When water no longer separates, 15 parts of o-chlorophenyl isocyanate is introduced; and heating at the boiling point under reflux is resumed for 2 hours. An abundant ivory-colored precipitate is thrown down. This precipitate is 1-o-chlorophenyl-3-(α-phenyl-4-pyridylmethyl)urea which, recovered by filtration, is found to melt at 192–194° (with decomposition). The product has the formula

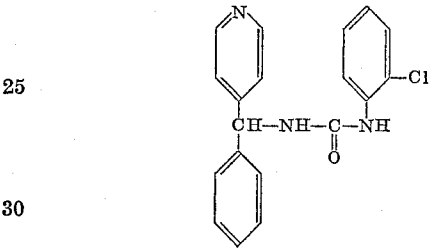

Example 5

*1 - p-chlorophenyl-3-methyl-3-(4-pyridylmethyl)urea.*—A solution of 12 parts of 4-(methylaminomethyl)pyridine and 15 parts of p-chlorophenyl isocyanate in 500 parts of anhydrous ether is heated at the boiling point under reflux for 3 hours, approximately 4 parts of ethanol being introduced 5 minutes prior to the end of the heating period to destroy excess isocyanate. The resultant mixture is extracted with 1000 parts of 5% hydrochloric acid, and the acid extract is made basic with a slight excess of sodium hydroxide. The mixture thus obtained is extracted with benzene; and the benzene extract is treated with decolorizing charcoal, filtered, and stripped of solvent by distillation. The residual oil solidifies to a colorless crystalline solid on standing. This solid is 1-p-chlorophenyl-3-methyl-3-(4-pyridylmethyl)urea, which melts at approximately 136–137° and has the formula

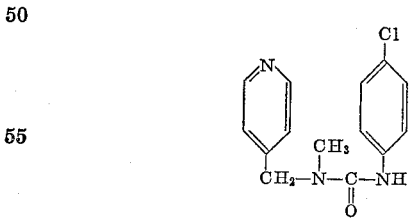

Example 6

A. *1 - m - chlorophenyl - 3-methyl-3-(4-pyridylmethyl)urea.*—Using the technique of the preceding Example 5, but substituting 15 parts of m-chlorophenyl isocyanate for the 15 parts of p-chlorophenyl isocyanate called for therein, one obtains 1-m-chlorophenyl-3-methyl-3-(4-pyridylmethyl)urea as a pale oil.

B. *1-m-chlorophenyl-3-methyl-3-(4-pyridylmethyl)urea hydrochloride.*—To 24 parts of the free base of the foregoing part A of this example dissolved in 200 parts of warm absolute ethanol is added just sufficient absolute 2-propanolic hydrogen chloride to achieve acidity. The resultant mixture is diluted with anhydrous ether to the point of incipient turbidity. Upon standing, 1-m-chlorophenyl - 3-methyl-3-(4-pyridylmethyl)urea hydrochloride precipitates as white crystals which, recrystallized from a mixture of absolute ether and anhydrous ethanol, melt at 143–147°. The product has the formula

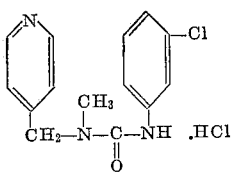

Example 7

A. *1 - o - chlorophenyl - 3 - methyl-3-(4-pyridylmethyl) urea.*—Using the technique of Example 5, but substituting 15 parts of o-chlorophenyl isocyanate for the 15 parts of p-chlorophenyl isocyante called for therein, one obtains 1-o-chlorophenyl-3-methyl-3-(4-pyridylmethyl)urea as a water-white oil.

B. *1-o-chlorophenyl-3-methyl-3-(4-pyridylmethyl)urea hydrobromide.*—To a solution of 24 parts of the base of the preceding part A of this example in 80 parts of warm absolute ethanol is added sufficient hydrogen bromide dissolved in absolute ethanol to make the solution barely acid, whereupon 80 parts of anhydrous ether is introduced. Upon standing, 1-o-chlorophenyl-3-methyl-3-(4-pyridylmethyl)urea hydrobromide precipitates as white crystals which, recovered on a filter and recrystallized from a mixture of absolute ethanol and anhydrous ether, melts at approximately 145–146° (with gas evolution). The product has the formula

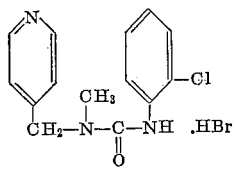

Example 8

*1 - o-chlorophenyl-3-methyl-3-(3-pyridylmethyl)urea.*—Using the technique of Example 5, but substituting 12 parts of 3-(methylaminomethyl)pyridine and 15 parts of o-chlorophenyl isocyanate for the 12 parts of 4-(methylaminomethyl)pyridine and 15 parts of p-chlorophenyl isocyanate called for therein, respectively, one obtains 1-o-chlorophenyl-3-methyl-3-(3-pyridylmethyl)urea as a pale yellow oil. The product has the formula

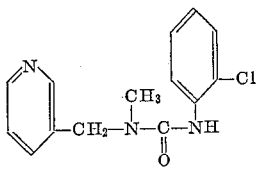

Example 9

A. *1 - o - chlorophenyl - 3-methyl-3-(2-pyridylmethyl) urea.*—Using the technique of Example 5, but substituting 12 parts of 2-(methylaminomethyl)pyridine and 15 parts of o-chlorophenyl isocyanate for the 12 parts of 4-(methylaminomethyl)pyridine and 15 parts of p-chlorophenyl isocyanate called for therein, respectively, one obtains 1-o-chlorophenyl-3-methyl-3-(2-pyridylmethyl)urea as a colorless oil.

B. *1-o-chlorophenyl-3-methyl-3-(2-pyridylmethyl)urea hydrobromide.*—The hydrobromide of the base of the foregoing part A of this example is prepared by the technique detailed in Example 7B hereinbefore. It melts at approximately 134–135° and has the formula

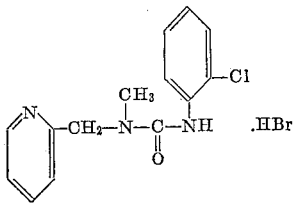

Example 10

*1 - (2,5 - dichlorophenyl)-3-methyl-3-(4-pyridylmethyl) urea.*—Using the technique of Example 5, but substituting 19 parts of 2,5-dichlorophenyl isocyanate for the 15 parts of p-chlorophenyl isocyanate called for therein, one obtains 1 - (2,5 - dichlorophenyl) - 3 - methyl-3-(4-pyridylmethyl)urea as a colorless solid melting at 95–97°. The product has the formula

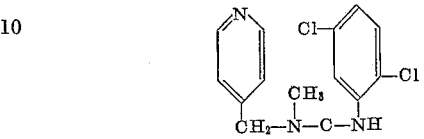

Example 11

*1 - p-bromophenyl-3-methyl-3-(4-pyridylmethyl)urea.*—Using the technique of Example 5, but substituting 20 parts of p-bromophenyl isocyanate for the 15 parts of p-chlorophenyl isocyanate called for therein, one obtains 1 - p - bromophenyl-3-methyl-3-(4-pyridylmethyl)urea as white needles melting at approximately 159–160°. The product has the formula

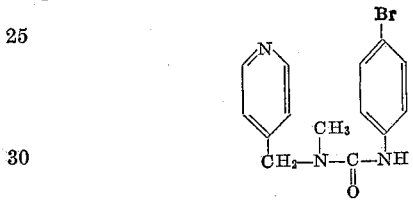

Example 12

*1 - p - iodophenyl-3-methyl-3-(4-pyridylmethyl)urea.*—Using the technique of Example 5, but substituting 25 parts of p-iodophenyl isocyanate for the 15 parts of p-chlorophenyl isocyanate called for therein, one obtains 1-p-iodophenyl-3-methyl-3-(4-pyridylmethyl)urea, which has the formula

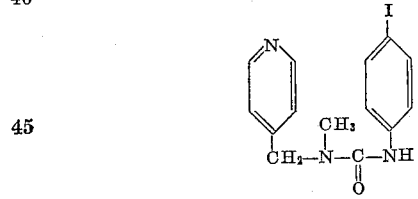

Example 13

*1-m-fluorophenyl-3-methyl-3-(4-pyridylmethyl)urea.*—Using the technique of Example 5, but substituting 14 parts of m-fluorophenyl isocyanate for the 15 parts of p-chlorophenyl isocyanate called for therein, one obtains 1 - m - fluorophenyl - 3 - methyl-3-(4-pyridylmethyl)urea, which has the formula

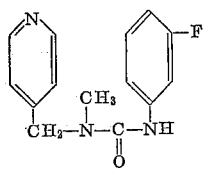

Example 14

A. *4-(butylaminomethyl)pyridine.*—A mixture of 108 parts of 4-aminomethylpyridine, 72 parts of n-butyraldehyde, and 20 parts of platinum oxide catalyst in 1000 parts of ethanol is maintained with agitation under 3 atmospheres of hydrogen until hydrogen uptake indicates that reduction of the Schiff base formed in process is complete. Catalyst is then removed by filtration and the filtrate is stripped of solvent by vacuum distillation. The residual high-boiling oil is the desired 4-(butylaminomethyl)pyridine.

B. *N - methyl-o-chlorophenylcarbamoyl chloride.*—A solution of 142 parts of 2-chloro-N-methylaniline in 1500 parts of dry ethyl acetate is added over a period of 3 hours to 500 parts of dry ethyl acetate previously saturated with phosgene. During the addition, a steady stream of phosgene is bubbled through the solution to insure that an excess of phosgene is present. Toward the end of the addition, the reactants are heated to gentle boiling under reflux. When addition is complete, the ethyl acetate is removed by vacuum distillation. The residue is the desired N-methyl-o-chlorophenylcarbamoyl chloride.

C. *1 - butyl - 3 - o-chlorophenyl-3-methyl-1-(4-pyridylmethyl)urea.*—To the N-methyl-o-chlorophenylcarbamoyl chloride obtained by the procedure of the foregoing part B of this example dissolved in 1000 parts of butanone is added 166 parts of 4-(butylaminomethyl)-pyridine. The resultant mixture is heated at the boiling point under reflux for 15 hours, then cooled and extracted with dilute hydrochloric acid. The acid extract is washed with ether and thereupon made alkaline with caustic. The resultant mixture is extracted with ether. Upon evaporation of solvent from the ether extract, there remains 1-butyl-3-o-chlorophenyl-3-methyl-1-(4-pyridylmethyl)urea, of the formula

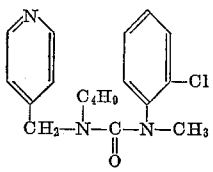

*Example 15*

A. *3,4,5-trimethoxyphenyl isocyanate.*—To 1000 parts of toluene is added, during 1½ hours and with vigorous agitation, a solution of 237 parts of 3,4,5-trimethoxybenzoyl azide in 2500 parts of ether, heat being supplied as necessary to maintain internal temperatures in the range 80–90° while ether distills out and nitrogen is copiously evolved. When the addition is complete, the resultant solution is heated at 95° with continued agitation for 1 hour, whereupon it is distilled in vacuo, the toluene coming over first and the desired 3,4,5-trimethoxyphenyl isocyanate in the fraction boiling at 102–110° under 0.4 mm. pressure. The product solidifies on standing. It melts at 42–45°.

B. *1-(3,4,5 - trimethoxyphenyl) - 3 - (4-pyridylmethyl) urea.*—A solution of 11 parts of 4-aminomethylpyridine and 21 parts of 3,4,5-trimethoxyphenyl isocyanate in 500 parts of anhydrous ether is heated at the boiling point under reflux for 3 hours, approximately 4 parts of ethanol being introduced 5 minutes prior to conclusion of the heating period in order to destroy excess isocynate. The precipitate formed in process is 1-(3,4,5-trimethoxyphenyl)-3-(4-pyridylmethyl)urea which, collected on a filter and dried in air, melts at 170.5–172.5°.

C. *1-(3,4,5 - trimethoxyphenyl) - 3 - (4-pyridylmethyl) urea hydrochloride.*—The hydrochloride of the free base of the foregoing part A of this example, prepared by the technique detailed in Example 1B, melts at 222–224° (with gas evolution). The product has the formula

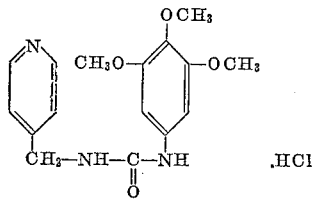

*Example 16*

A. *1-(3,4,5 - trimethoxyphenyl) - 3 - (3-pyridylmethyl) urea.*—Using the technique of Example 15B, but substituting 11 parts of 3-aminomethylpyrdine for the 11 parts of 4-aminomethylpyridine called for therein, one obtains 1-(3,4,5 - trimethoxyphenyl)-3-(3-pyridylmethyl) urea as a white powder melting at 164–166°.

B. *1-(3,4,5-trimethoxyphenyl) - 3 - (3-pyridylmethyl) urea hydrochloride.*—The hydrochloride of the free base of the foregoing part A of this example, prepared by the technique detailed in Example 1B, melts at approximately 169–170° (with decomposition). The product has the formula

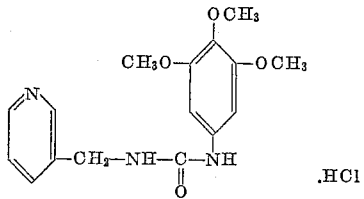

*Example 17*

*1-(3,4,5-trimethoxyphenyl)-3-(2-pyridylmethyl)urea.*—Using the technique of Example 15B, but substituting 11 parts of 2-aminomethylpyridine for the 11 parts of 4-aminomethylpyridine called for therein, one obtains 1-(3,4,5-trimethoxyphenyl)-3-(2-pyridylmethyl)urea as a white powder melting at approximately 164–165.5°. The product has the formula

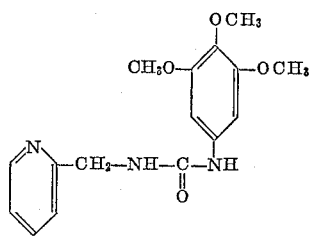

*Example 18*

*1-o - ethoxyphenyl - 3 - (4 - pyridylmethyl)urea.*—Using the technique of Example 1A, but substituting 16 parts of o-ethoxyphenyl isocyanate for the 16 parts of p-chlorophenyl isocyanate called for therein, one obtains 1-o-ethoxyphenyl-3-(4-pyridylmethyl)urea, which has the formula

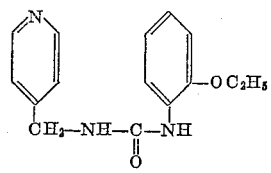

*Example 19*

*1 - p-methoxyphenyl - 3 - (α-phenyl - 4-pyridylmethyl) urea.*—Using the technique of Exampule 4B, but substituting 15 parts of p-methoxyphenyl isocyanate for the 15 parts of o-chlorophenyl isocyanate called for therein, one obtains 1-p-methoxyphenyl-3-(α-phenyl-4-pyridylmethyl) urea as ivory crystals which melt at 134–136°. The product has the formula

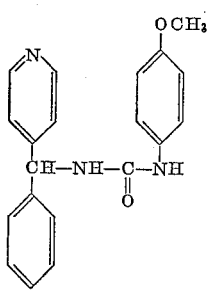

*Example 20*

*1-(3,4,5-trimethoxyphenyl)-3-(α-phenyl-4-pyridylmethyl)urea.*—Using the technique of Example 4B, but substituting 21 parts of 3,4,5-trmethoxyphenyl isocyanate for the 15 parts of o-chlorophenyl isocyanate called for therein, one obtains 1-(3,4,5-trimethoxyphenyl)-3-(α-phenyl-4-pyridylmethyl)urea as ivory-colored hair-like needles melting at 197–199°. The product has the formula

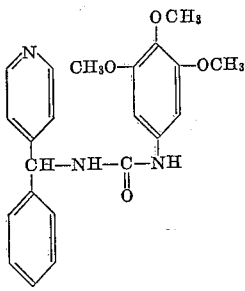

Example 21

A. *1-p-methoxyphenyl - 3 - methyl-3-(4 - pyridylmethyl)urea.*—Using the technique of Example 5, but substituting 15 parts of p-methoxyphenyl isocyanate for the 15 parts of p-chlorophenyl isocyanate called for therein, one obtains 1-p-methoxyphenyl-3-methyl-3-(4-pyridylmethyl)urea as white crystals melting at approximately 118–121.5°.

B. *1 - p - methoxyphenyl-3-methyl-3-(4-pyridylmethyl)urea hydrochloride.*—A solution of 25 parts of 1-p-methoxyphenyl-3-methyl-3-(4-pyridylmethyl)urea in 200 parts of warm absolute ethanol is diluted with 2-propanolic hydrogen chloride until just acid, whereupon sufficient anhydrous ether is introduced to bring about incipient turbidity. Upon standing, 1-p-methoxyphenyl-3-methyl-3-(4-pyridylmethyl)urea hydrochloride precipitates as white crystals which, recrystallized from a mixture of absolute ethanol and anhydrous ether, melt at 196–198°. The product has the formula

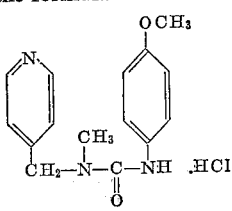

Example 22

*1 - p - ethoxyphenyl - 3 - methyl - 3 - (4 - pyridylmethyl)urea.*—A solution of 12 parts of 4-(methylaminomethyl)pyridine and 16 parts of p-ethoxyphenyl isocyanate in 500 parts of anhydrous ether is heated at the boiling point under reflux for 1 hour, 4 parts of ethanol being introduced 5 minutes prior to termination of the heating period to destroy any excess isocyanate. The precipitate formed in process is recovered on a filter and washed thereon with ether. The material thus obtained is 1-p-ethoxyphenyl-3-methyl-3-(4-pyridylmethyl)urea, the melting point of which is 132–133.5°. The product has the formula

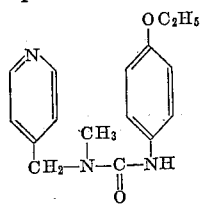

Example 23

*1-o-ethoxyphenyl-3-methyl-3-(4-pyridylmethyl)urea.*—A solution of 12 parts of 4-(methylaminomethyl)pyridine and 16 parts of o-ethoxyphenyl isocyanate in 500 parts of anhydrous ether is heated at the boiling point under reflux for 1 hour, 4 parts of ethanol being introduced approximately 5 minutes prior to termination of the heating period in order to destroy excess isocyanate. At the close of the heating period, the solution which results is extracted with 500 parts of 5% hydrochloric acid. The acid extract is made alkaline with aqueous caustic soda, whereupon 1-(o-ethoxyphenyl)-3-methyl-3-(4-pyridylmethyl)urea crystallizes from solution as a hydrate. The hydrate melts at 64–67°. The water of crystallization is removed by heating the hydrate to 110° in vacuo for 5 minutes. The white granular anhydrous 1-o-ethoxyphenyl-3-methyl-3-(4-pyridylmethyl)urea thus obtained melts at approximately 106–107° and has the formula

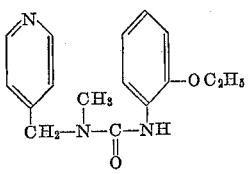

Example 24

*1 - p - ethoxyphenyl - 3 - methyl - 3 - (3 - pyridylmethyl)urea.*—Using the technique of Example 22, but substituting 12 parts of 3-(methylaminomethyl)pyridine for the 12 parts of 4-(methylaminomethyl)pyridine called for therein, one obtains 1-p-ethoxyphenyl-3-methyl-3-(3-pyridylmethyl)urea as colorless flakes melting at approximately 118–119°. The product has the formula

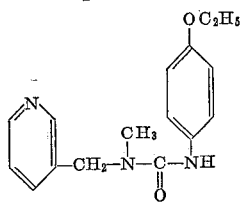

Example 25

*1 - p - ethoxyphenyl - 3 - methyl - 3 - (2 - pyridylmethyl)urea.*—A solution of 12 parts of 2-(methylaminomethyl)pyridine and 16 parts of p-ethoxyphenyl isocyanate in 500 parts of anhydrous ether is heated at the boiling point under reflux for 1 hour, 4 parts of ethanol being introduced approximately 5 minutes before cessation of the heating period to destroy excess isocyanate. A solution of 4 parts of hydrogen chloride in 200 parts of anhydrous ether is added to precipitate the hydrochloride salt of the desired base as a semi-crystalline plastic material. Supernatant ether is removed by decantation, and the residue is thereupon taken up in 500 parts of water. The resultant aqueous solution is washed thrice with 200-part quantities of ether, then made basic with concentrated aqueous caustic soda. The resultant mixture is extracted with ether; and the ether extract is dried over anhydrous potassium carbonate, filtered, and stripped of solvent by distillation. The residual pale yellow, viscous oil is 1-p-ethoxyphenyl-3-methyl-3-(2-pyridylmethyl)urea, which solidifies to a low-melting waxen material on standing. The product has the formula

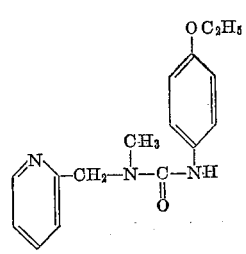
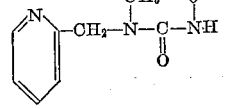

Example 26

*1 - (3,4,5 - trimethoxyphenyl) - 3 - methyl - 3 - (4 - pyridylmethyl)urea.*—Using the technique of Example 5, but substituting 21 parts of 3,4,5-trimethoxyphenyl isocyanate for the 15 parts of p-chlorophenyl isocyanate called for therein, one obtains 1-(3,4,5-trimethoxyphenyl)-3-methyl- 3-(4-pyridylmethyl)urea as white crystals which melt at 147.5–149°. The product has the formula

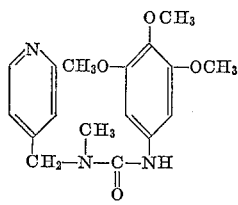

What is claimed is:
1. A compound of the formula

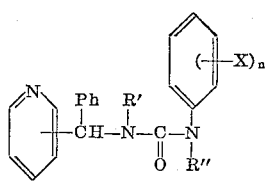

wherein Ph is selected from the group consisting of hydrogen and phenyl radicals, R' and R" are selected from the group consisting of hydrogen and lower alkyl radicals, X is selected from the group consisting of halogen and lower alkoxy radicals, and $n$ is a positive integer less than 4.

2. A compound of the formula

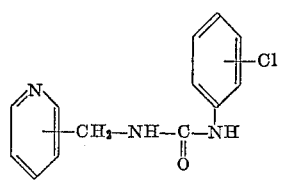

3. 1-p-chlorophenyl-3-(3-pyridylmethyl)urea.
4. 1-o-chlorophenyl-3-(α-phenyl-4-pyridylmethyl)urea.
5. A compound of the formula

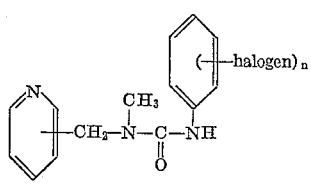

wherein $n$ is a positive integer less than 3.

6. A compound of the formula

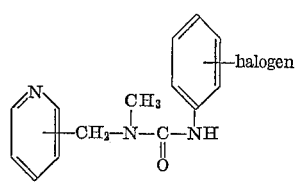

7. A compound of the formula

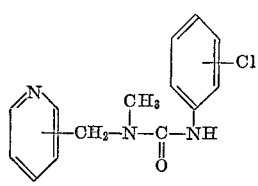

8. A compound of the formula

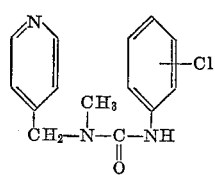

9. 1-o-chlorophenyl-3-methyl-3-(4-pyridylmethyl)urea.
10. A compound of the formula

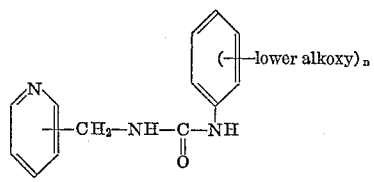

wherein $n$ is a positive integer less than 4.

11. A compound of the formula

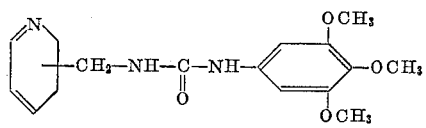

12. 1-(3,4,5 - trimethoxyphenyl)-3-(4-pyridylmethyl)-urea.
13. A compound of the formula

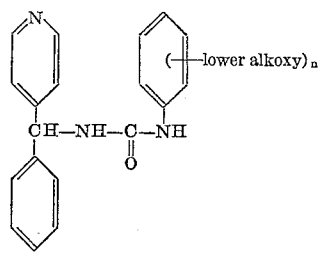

wherein $n$ is a positive integer less than 4.
14. 1 - p-methoxyphenyl-3-(α-phenyl-4-pyridylmethyl) urea.
15. A compound of the formula

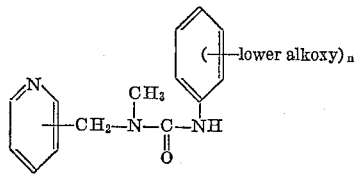

wherein $n$ is a positive integer less than 4.
16. A compound of the formula

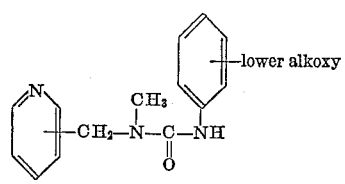

17. A compound of the formula

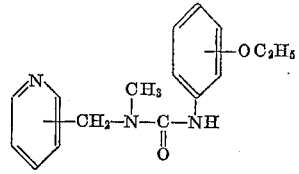

18. A compound of the formula

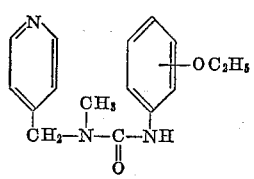

19. 1 - p - ethoxyphenyl-3-methyl-3-(4-pyridylmethyl) urea.

(References on following page)

References Cited in the file of this patent

UNITED STATES PATENTS

| | | |
|---|---|---|
| 2,042,023 | Schonhofer et al. | May 26, 1936 |
| 2,477,872 | Haury et al. | Aug. 2, 1949 |
| 2,802,008 | Burtner et al. | Aug. 6, 1957 |
| 2,865,929 | Beaver et al. | Dec. 23, 1958 |
| 2,949,459 | Mizzoni | Aug. 16, 1960 |
| 2,993,930 | Chappelow et al. | July 25, 1961 |

FOREIGN PATENTS 465,800   Canada _____ June 14, 1950

OTHER REFERENCES

Noller: "Chemistry of Organic Compounds," pages 308, 309, 311, 317, 326 (1957), Saunders.

Robison et al.: J.A.C.S., vol. 77, pp. 6554–9 (1955).

Buu-Hoi et al.: J. Chem. Soc., 1955, pages 1573–81 (1955).

Friedman et al.: J.A.C.S., vol. 69, pages 1795–6 (1947).

UNITED STATES PATENT OFFICE
CERTIFICATE OF CORRECTION

Patent No. 3,128,280  April 7, 1964

Kurt J. Rorig

It is hereby certified that error appears in the above numbered patent requiring correction and that the said Letters Patent should read as corrected below.

Column 2, line 35, for "paargraph" read -- paragraph --; column 3, lines 21 to 29, the formula should appear as shown below instead of as in the patent:

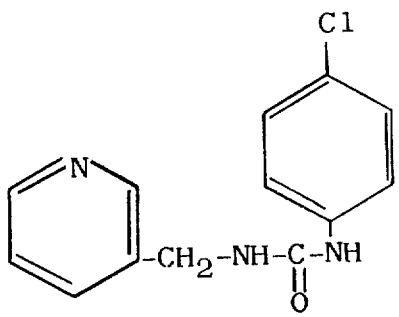

same column 3, line 66, for "temperature" read -- temperatures --; column 4, line 61, column 5, line 11, and column 6, line 2, for "-(4-pyridylmethyl)", in italics, each occurrence, read -- -(4-pyridylmethyl)- --, in italics; column 5, line 54, for "-(2-pyridylmethyl)", in italcis, read -- -(2-pyridylmethyl)- --, in italics; column 6, lines 10 to 15, the formula should appear as shown below instead of as in the patent:

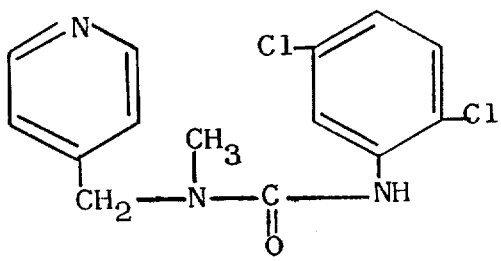

column 7, line 16, for "4-(butylaminomethyl)-pyridine" read -- 4-(butylaminomethyl)pyridine --; line 53, for "isocynate" read -- isocyanate --; column 7, lines 62 to 70, the formula 3,128,280 should appear as shown below instead of as in the patent:

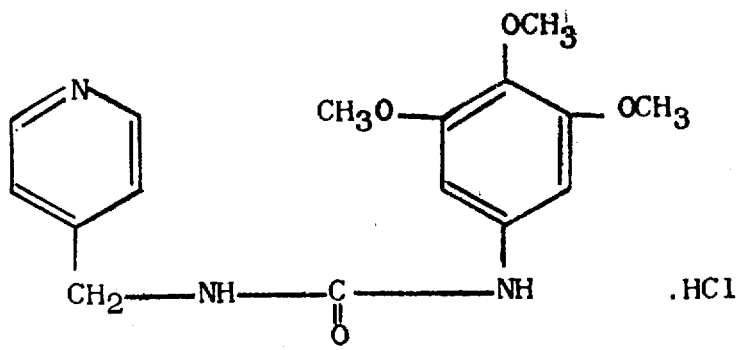

same column 7, line 74, for "3-aminomethylpyrdine" read
-- 3-aminomethylpyridine --; column 8, line 1, for "-(3-pyridyl-
methyl)" read -- -(3-pyridylmethyl)- --; line 53, for "Exampule"
read -- Example --; line 75, for "3,4,5-trmethoxyphenyl" read
-- 3,4,5-trimethoxyphenyl --; column 12, lines 33 and 73, for
"-pyridylmethyl)", each occurrence, read -- -pyridylmethyl)- --.

Signed and sealed this 11th day of August 1964.

(SEAL)
Attest:

ERNEST W. SWIDER
Attesting Officer

EDWARD J. BRENNER
Commissioner of Patents